United States Patent [19]
Warren et al.

[11] B 3,922,590
[45] Nov. 25, 1975

[54] ELECTRICAL SYSTEMS AND APPARATUS

[75] Inventors: Anthony Charles Warren, Fulbourne; Bryan Frederick Nicholls, Northampton, both of England

[73] Assignee: The Mettoy Company Limited, Northampton, England

[22] Filed: Apr. 20, 1973

[21] Appl. No.: 352,950

[44] Published under the Trial Voluntary Protest Program on January 28, 1975 as document no. B 352,950.

[30] Foreign Application Priority Data
Apr. 20, 1972 United Kingdom............... 18389/72
Oct. 4, 1972 United Kingdom............... 45684/72

[52] U.S. Cl. ................. 318/138; 318/254; 310/156
[51] Int. Cl.² ......................................... H02K 29/00
[58] Field of Search ............ 318/138, 254; 310/156

[56] References Cited
UNITED STATES PATENTS

| | | |
|---|---|---|
| 3,230,434 | 1/1966 | Bauerlein...................... 318/254 X |
| 3,331,005 | 7/1967 | Lear et al. ......................... 318/254 |
| 3,586,942 | 6/1971 | McMahan......................... 318/254 |
| 3,634,873 | 1/1972 | Nishimura......................... 318/254 |
| 3,678,359 | 7/1972 | Peterson ........................... 318/254 |
| 3,683,248 | 8/1972 | Kobayashi et al. ............ 318/254 X |
| 3,706,923 | 12/1972 | Dunfield............................ 318/254 |

*Primary Examiner*—G. Z. Rubinson
*Attorney, Agent, or Firm*—Brisebois & Kruger

[57] ABSTRACT

An electric motor comprises a permanent magnet rotor having a ring of material containing permanent magnetic material bonded by a plastic material magnetised to provide a number of magnetic poles of alternately opposite polarity and a stator with associated winding arranged to produce magnetic stator poles which co-operate with the magnetic poles of the rotor to drive said rotor. A reed switch is provided for sensing the speed of rotation of the rotor to provide a signal which is used to control the speed of the motor. Preferably, the stator is situated opposite a portion only of the circumference of the ring of material containing permanent magnetic material.

8 Claims, 10 Drawing Figures

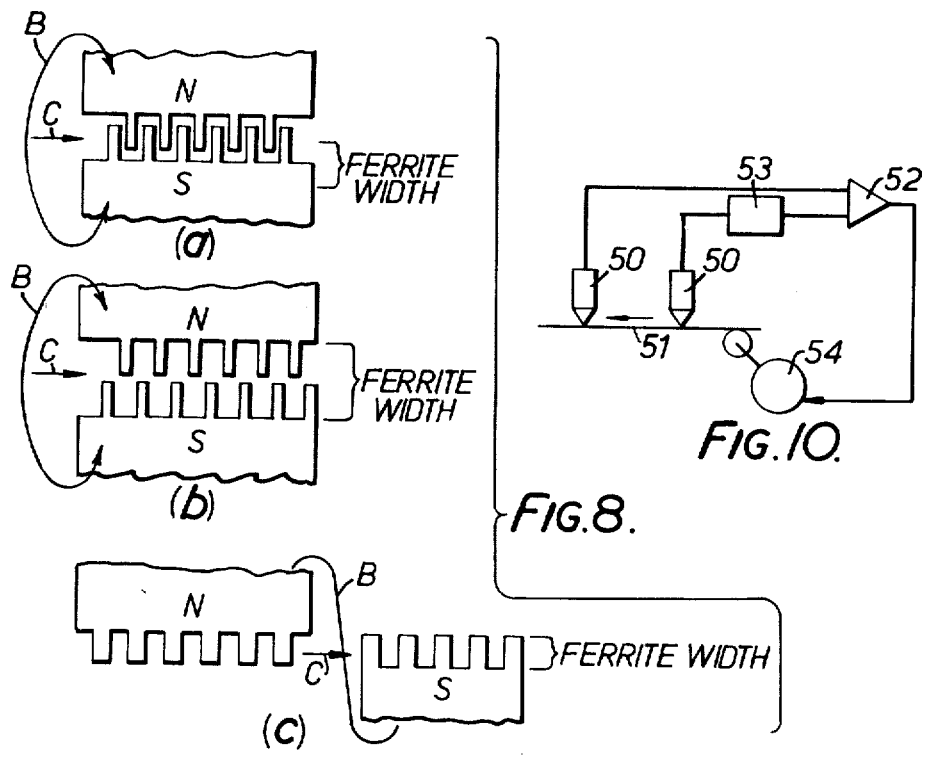
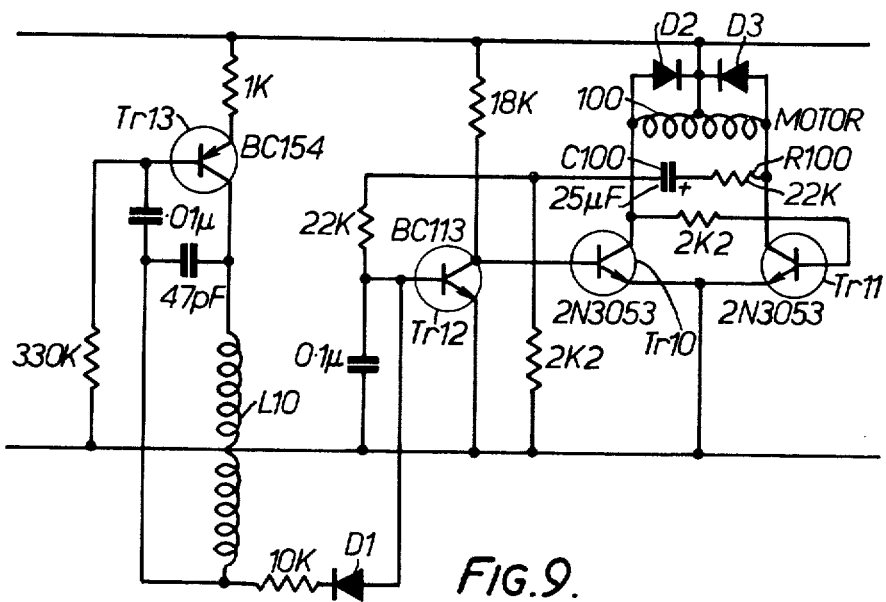

ELECTRICAL SYSTEMS AND APPARATUS

BACKGROUND

The present invention relates to electrical systems and apparatus making use of electric motors.

The present invention concerns an electric motor having a permanent magnet rotor and which is of a type suitable for driving a gramophone turntable but which can be applied to other uses in which the rotation of the motor can be closely controlled either as to speed, phase, position or torque.

PRIOR ART

In the past there have been many designs of electric motors of this type either proposed or put into service. A motor of the type to which the invention refers will comprise a magnet rotor presenting defined poles, an energised rotor magnetic assembly presenting cooperating defined poles. The rotor can be energised by alternating current, but if the supply is a direct current means are required to switch the stator supply.

In one prior suggestion it has been proposed to use a permanent magnet rotor in which the magnet material is a ferrite material bonded with a suitable bonding agent. Of itself, such an arrangement has the advantages of the ferrite loaded material.

In another prior and unrelated suggestion, a motor has been proposed having a rotor the angular extent of which is less than the full periphery of the rotor. In another suggestion, as a means for deriving a signal which is indicative of rotor position it has been proposed to use magnetically operated contacts.

The present invention concerns a motor of the type described, of improved performance and, as will appear, uses certain of these features, to provide a design of motor which is versatile in application and satisfactory in use.

THE INVENTION

The invention includes an electric motor comprising a rotor, a ring of material containing permanent magnetic material bonded by a plastic material magnetised to provide a number of magnetic poles of alternately opposite polarity, a stator providing a plurality of pole faces, a winding on said stator arranged when energised to produce magnetic stator poles to co-operate with the magnetic poles of the rotor to drive said motor, means arranged to respond to the rotation of the rotor to derive an electrical signal in accordance with the rotation of the rotor, and means responsive to said signal for controlling energisation of said winding and the rotation of the rotor.

THE DRAWINGS

Features and advantages of the invention will also appear from the following description of embodiments thereof, given by way of example, in conjunction with the accompanying drawings in which:

FIG. 8 shows different pole arrangements;

FIG. 9 shows an alternative circuit diagram of a motor control system; and

FIG. 10 shows diagrammatically an electric motor of the type shown in FIG. 1 used in a tape transport mechanism.

Figure 1:
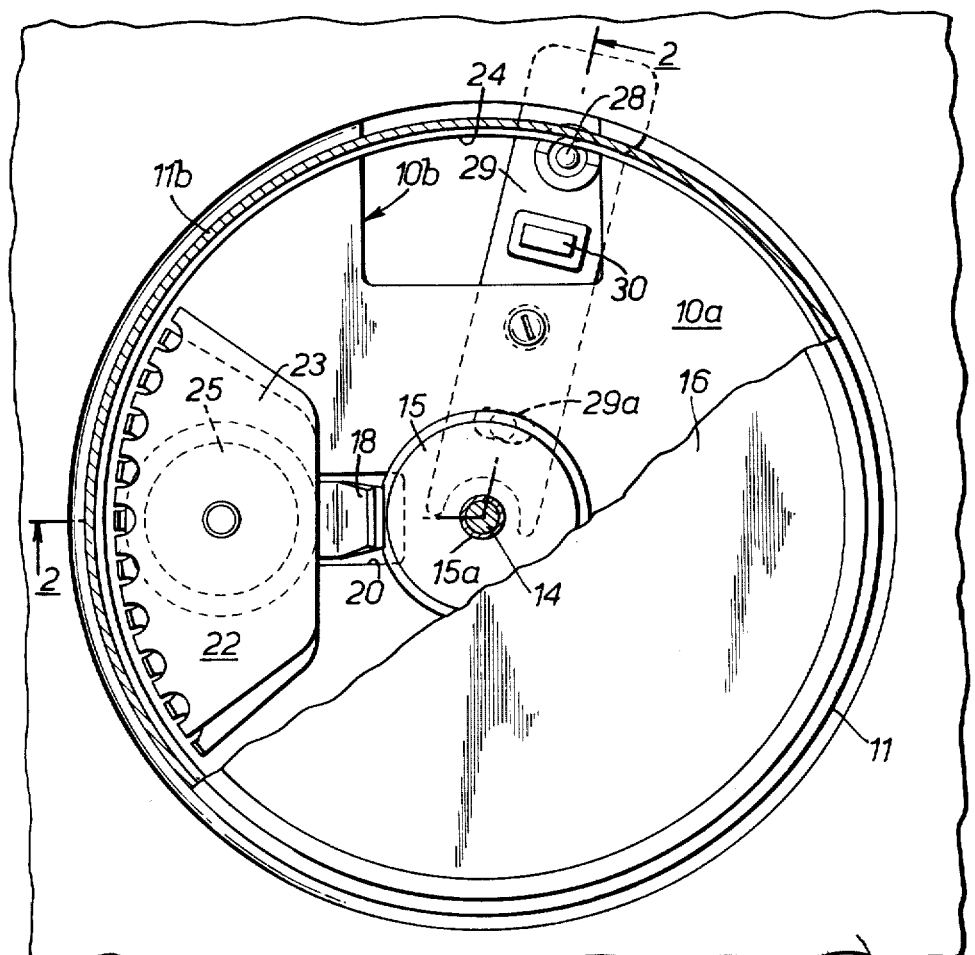
FIG. 1 is a partly simplified plan view of a combined gramophone turntable and motor, with a portion of the turntable removed.
Figure 2:
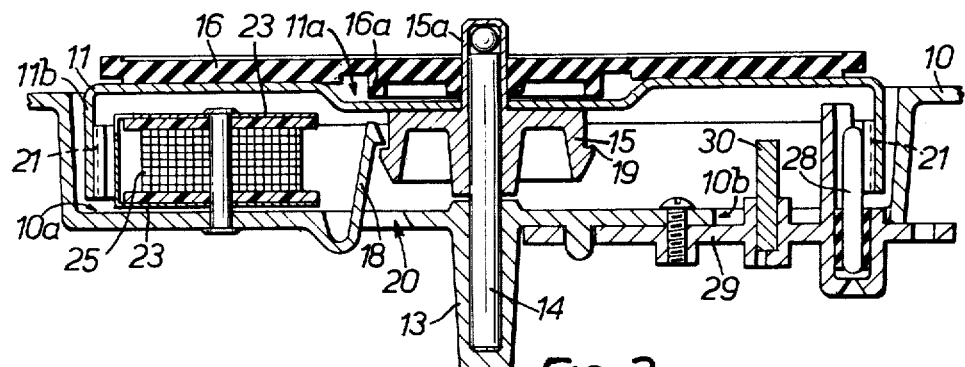
FIG. 2 is a section on the line 2—2 of FIG. 1.

A gramophone turntable and motor assembly is shown in FIGS. 1 and 2. The assembly includes a support panel or deck 10, on which the turntable 11 is rotatably mounted. The deck has a circular recessed portion 10a in the centre of which is a boss 13; the boss has a blind bore in which fits a shaft 14. The turntable is mounted for rotation by being attached to a further boss 15 which is supported by and rotates on the upper end of the shaft 14 extending from the boss 13. An extension 15a of the boss 15 projects through a hole in the centre of the turntable 11 and a bearing ball is received in the extension 15a between the upper end of the shaft 14 and the end of the bore in the extension.

The turntable comprises a generally flat upper surface having a circular recessed portion 11a in the centre and a depending peripheral portion 11b. A mat 16 is placed on the flat upper surface of the turntable, the extension 15a projecting through a hole in the mat 16 and forming the spindle of the turntable. The mat 16 is shown in FIG. 2 to have a central annular projection 16a which is received in the recessed portion 11a in the turntable when records having the standard small central hole are to be played. However, if it is wished to play records having a larger central hole, the mat 16 is turned over and the annular projection 16a is used to centre the record on the turntable.

The turntable 11 is retained in position by a number of resilient latching arms 18 only one of which is shown in the drawings. The ends of the arms 18 are barbed and located such that if the turntable 11 and attached boss 15 are lifted vertically upwards the barbed ends of the arms 18 engage a shoulder 19 round the exterior of the boss 13. The turntable can be removed from the deck by inserting a suitable device through apertures 20 in the recessed portion 10a to move the arms 18 away from the latching position.

The turntable and deck can both be formed of moulded plastics material, but in the present case the turntable is made of metal to give it a higher moment of inertia and hence make it rotate more smoothly.

The depending peripheral portion 11a of the turntable 11 carries a ring 24 of magnetic material. The preferred material for ring 24 is a ferrite material bonded by a suitable plastic, applied as a strip to the inner surface of the periphery of the turntable. The ring can be accommodated in a recess, not shown, at this point. It is also possible, if the turntable is moulded, for the ferrite to be moulded in or integrally with the turntable. In some circumstances when a non-magnetic material is used for the turntable it may be preferable or desirable to include an outer ring 21, shown in broken lines in FIG. 2 of high permeability magnetic material, for a reason which will be apparent hereinafter.

Figure 3:
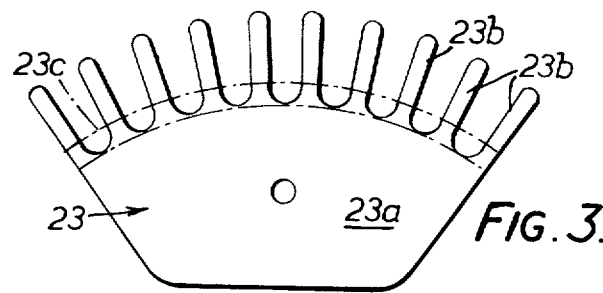
FIG. 3 is a developed view of a stator magnetic pole member.

The ferrite material chosen has a high retentivity and is permanently magnetised in a direction to present a series of magnetic pole faces exposed on the inner surface of the ring of material and alternately of opposite polarity, and cooperating with a stator magnetic assembly indicated generally at 22 in FIG. 1. This magnetic assembly includes two similar pole members 23, the developed shape of one of which is shown in FIG. 3, with a body portion 23a, and outwardly extending fingers 23b on one edge. The fingers 23b are bent at right angles to body portion 23a along line 23c to present a series of outwardly facing pole pieces. One pole member 23 is attached to each end of a coil 24 such that the fingers 23b of one pole piece interdigitate with the fingers of the other pole member 23. The pole members are attached to the coil by means of a screw which also fixes the thus formed stator to the recess 10a in the deck 10.

The series of outwardly facing pole pieces will be of alternate polarity when an energising current is passed through the coil 25. The peripheral extent of each such pole piece corresponds to the peripheral extent of the magnetic pole faces formed on the ferrite magnet ring 24. Other ways of producing the stator pole faces can be employed.

If desired, the pole members 23 can extend substantially around the periphery of the turntable or they can be reduced to a number of discrete sections, each less than 90°; the section shown in FIG. 1 occupies about 60°. There is some advantage if an even number of such sections is used, to give a more balanced drive to the turntable, but the use of a single element as shown has the advantage of economy and has been found to work satisfactorily.

Means are provided, responding to the rotation of the turntable, to derive an electrical signal. A variety of devices can be used for this purpose, such as a Hall effect probe, a magnetoresistive element, an optical system including a light source and sensor with apertures of reflective portions on the turntable rim, or contacts can be used. However, a convenient and effective method of deriving the desired electrical signal is by means of a dry reed switch 28, supported on a sub-plate 29 attached to the bottom of recess 10a. The reed switch projects through an aperture 10b in the recess 10a and is mounted in a position in which it will be subject to the external magnetic field from the pole faces on the ferrite member 24; as shown the reed switch is arranged close to the surface of ring 24 with its length at right angles to the general plane of the turntable. In order to adjust the sensitivity of the reed switch so that it will respond to each passage of a pole pair past the reed switch, an adjusting permanent magnet 30 is also mounted in the sub-plate 29. Means are provided, for example by means of a simple slide moving in an aperture 10b in the sub-plate, to allow the position of the reed switch on installation, to be adjusted relative to ferrite loaded ring 24. The reed switch senses the rotation of the rotor associated with a circuit controlling a supply d.c. in order to produce driving current for the motor stator.

The motor as thus far described could be operated by alternating current from, for example, a main supply fed to the coil of the magnetic assembly, though the motor would not then be self-starting. The motor can be made self-starting either by providing a detent mechanism, which will ensure that the motor will assume a position, when stationary and de-energised, such that the application of the alternating current will cause it to start to move in a desired direction, or alternatively, for an alternating current supply, shading members can be applied to part of the magnetic structure of the magnetic assembly, so that there will be a rotating component of magnetic field, which will cause the motor stator to rotate.

Figure 4:
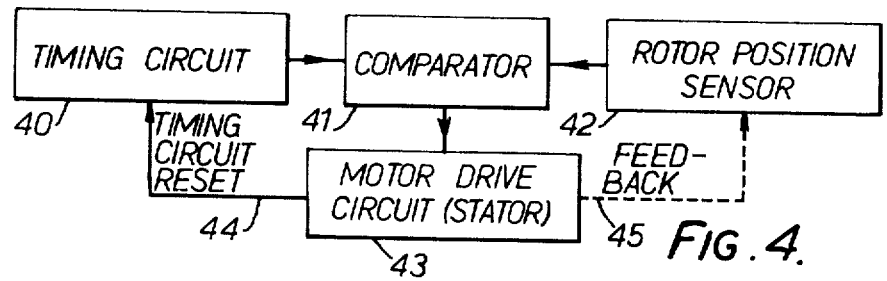
FIG. 4 is a block diagram of a motor control system.

For certain applications and especially for gramophone motor use, it may be preferable to arrange that the motor is capable of being driven by means of a direct current supply, and such as can conveniently be provided by means of dry cells. A suitable control for producing driving pulses from a direct supply is indicated in FIG. 4. In this type of control, means are provided for operating the motor in a manner which provides a uniform speed of rotation, the speed being controllable.

The arrangement includes a timing circuit 40, which feeds a timed signal to a comparator 41 which also receives a signal from the rotor position sensor 42, such as the reed switch 28. The comparator output, with suitable amplification at 43, energises the operating coil of the motor with direct current pulses. A feedback signal from the motor is applied, over conductor 44, to the timing circuit to reset it. There will be a functional relationship, indicated by the broken line 45, from the motor drive to the rotor position sensor 42.

The timing circuit defines a reference time period which can be identified as $T_r$. The timing circuit is reset each time the current to the stator is reversed. The rotor position sensor will develop, at a time $T_s$, a signal which is indicative of rotor position. In the comparator circuit 41, if the time $T_s$ is greater than the time $T_r$, the next reversal of motor current will occur at time $T_r$. This will continue to be the case until the time interval $T_s$ is equal to $T_r$, whereupon the timing circuit controls the current reversals. By this operation, the motor will run up from rest to a constant speed condition. If there is a change of speed from this uniform speed, for example due to change of load on the turntable, there will be a change in the relative timing of the rotor sensor pulses, and the circuit will operate in a corrective sense to bring the rotor speed back to the desired controlled value.

With the operation described, the rotor shows no preferred direction of rotation, and could run in either direction. In order to impose a preferential direction, the reed switch can be positioned slightly to one side of a pole position, and there is then a strong preferential direction, to the extent of inhibiting reverse rotation.

It can also be arranged that the rotor will always come to rest in a position, with respect to the stator, such that a starting torque, in the desired direction, will be produced when the motor is energised. This can take the form of a magnetic positioning or similar detent device and a magnet can be used both to bias the reed switch and provide the detent operation. It may be observed that by reversing the magnetic axis of the permanent magnet 30, or by repositioning the dry reed relay 28, the direction of rotation can be controlled.

Figure 5:
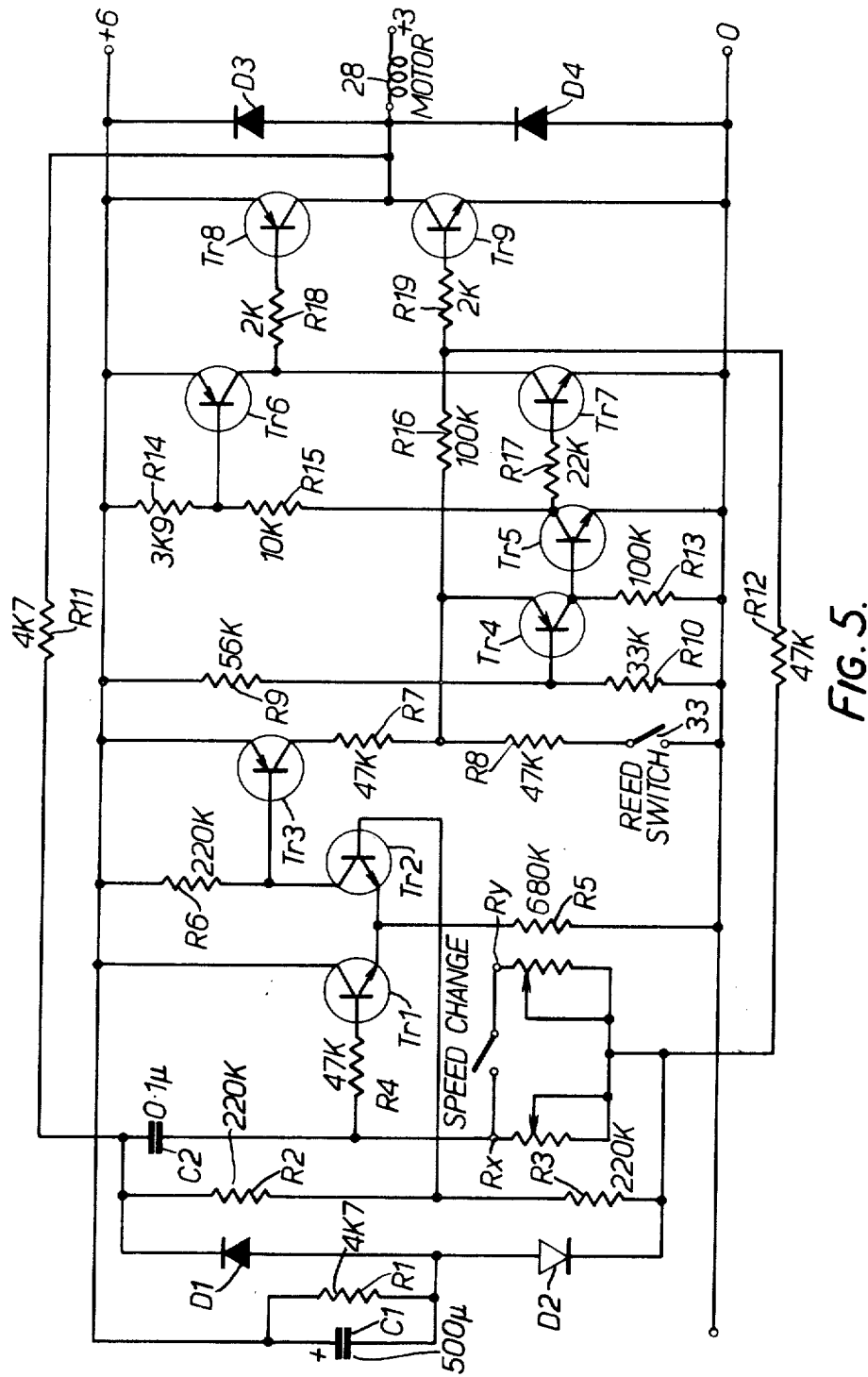
FIG. 5 is a more detailed circuit diagram of a motor control system.

One form of the circuit shown in block schematic form in FIG. 4 is given in FIG. 5. In view of the fact that in FIG. 5 circuit values are indicated, it is not considered necessary to describe the circuit in detail.

The reed switch contacts 28 are connected in series with the emitter collector path of the transistor Tr3, in series with two resistors R7 and R8. The junction of R7 and R8 is connected to the emitter of a transistor Tr4, the base of which is biased by resistors R9 and R10, and transistor Tr4, with two transistors Tr5 and Tr7 providing, with a feedback resistor R16, a bi-stable circuit. Transistor Tr7, with a further transistor Tr6, providing drive to two complementary transistors Tr8, and Tr9, connected across the supply, which feed the coil 25 of the motor. Diodes D3 and D4 are used to reduce switching spikes. With this arrangement, on switching on, the initial passage of current will cause the rotor to move; the movement of the rotor operates the reed switch, reversing the current flow in the coil of the motor, and the rotor begins to accelerate tending towards some limiting uniform speed.

To control the speed, the timing circuit is provided. This is arranged in the form of a bridge circuit comprising resistors R2, R3, capacitor C2 and two selectable variable resistors R$x$, R$y$. One diagonal of this bridge is energised by current pulses derived from the drive circuit, one connection being through resistor R11 to one terminal of the bridge, and the other from the base of transistor Tr9, through resistor R12 to the other terminal of the same diagonal of the bridge. The terminals of the other diagonal of the bridge are connected to the bases of two transistors Tr1 and Tr2 which, with a common emitter resistor R5, are arranged as a long-tailed pair. Transistor Tr2 has a collector resistor Tr6, the voltage across which is used to drive the base of transistor Tr3. The voltages which can be applied to the first diagonal of the bridge are limited by means of resistor R1 and shunt capacitor C1, and two diodes D1 and D2, the effect of which is to limit the negative voltage at either terminal of this diagonal of the bridge to the voltage on capacitor C1, which is approximately one half of the supply voltage, diminished by the voltage drop across one diode D1, or D2. This prevents any alternating components which may be present on the supply rails from affecting the operation of the circuit.

Figure 6:
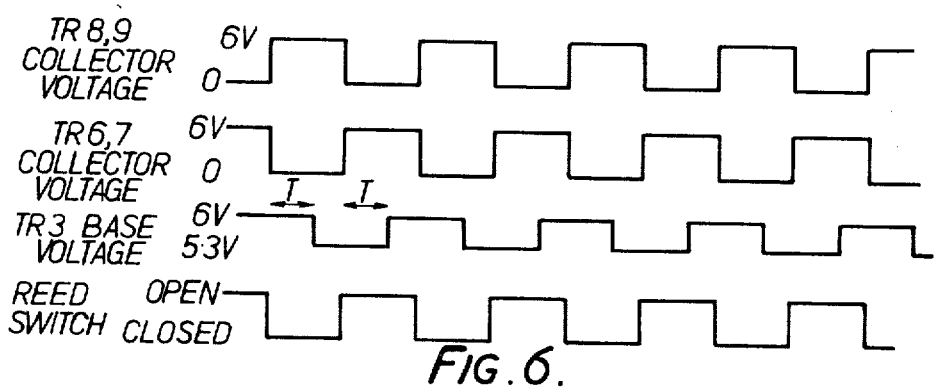
FIG. 6 is a waveform diagram pertaining to the operation of the circuit of FIG. 5 in one condition of operation.
Figure 7:
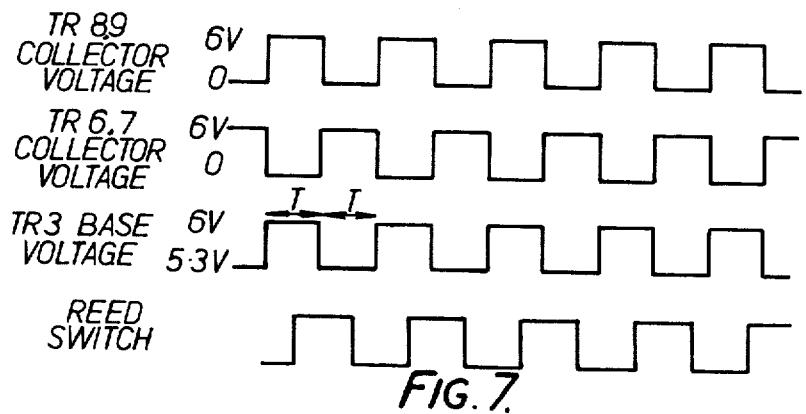
FIG. 7 is a waveform diagram pertaining to the operation of the circuit of FIG. 5 in another condition of operation.

The output pulses, from transistors Tr8, and Tr9 and from the output of transistor Tr7, are applied to the bridge circuit, the amplitude of these pulses being limited by the action of the diodes D1 and D2. In response to the start of one of the driving pulses, the voltage which appears at the base of transistor Tr1 will rise at a rate which is determined by the time constant of the circuit consisting of capacitor C2 and one or both of the resistors R$x$ and R$y$. Accordingly, the point in time at which the potential on the base of transistor Tr1 in relation to that at Tr2 is sufficient to switch transistor Tr3 will be delayed. Because the bridge is balanced, this time interval will be constant, and largely independent of variations of the supply voltage and for practical purposes the delay time is constant. If the motor is running at the desired speed, this time delay will be equal to the time delay between successive operations of the reed switch; that is to say, the speed of motor is such that successive transitions of poles across a given pole face occur at intervals which are equal to the delayed time to which the circuit has been set. If the motor should not be running at this speed then there will be a corresponding change in the switching time of the bi-stable circuit provided by transistors Tr4, Tr5, Tr7. For example, if the transistor Tr3 is switched on at a time when the reed switch contacts are open then the voltage at the collectors of transistors Tr6 and Tr7 will be high; if transistor Tr3 and the switch contacts are either both off or both on, the bi-stable will retain its existing state. In this way, the output of the bi-stable will change only when the latter of the transistor or the reed switch contacts have changed. In effect, this gives a compression or expansion of the output of the bi-stable, in the manner which is indicated in the waveforms of FIGS. 6 and 7. The method of motor control described is advantageous in giving both phase and velocity feed back.

The motor described can be modified in various ways, and can be used in a variety of applications. For example the stator magnetic assembly can be extended around the periphery of the stator, or may be disposed in a plurality of units or groups of units, such as that described. The units may be disposed around the periphery of the motor at regular intervals, in order to give a more symmetrical drive.

It is also possible to form the gramophone turntable, forming the rotor of the motor, as a body consisting substantially completely of the bonded magnetic material. For use of the apparatus described, both as a gramophone turntable motor and for other purposes, it is advantageous if the stator is mounted with a degree of torsional resilience, and for this purpose torsional flexible mountings can be provided, so that the stator can accommodate, and thereby absorb to some degree, minor pulsations or variations of speed of the rotor. Torsional mounting can be achieved by attaching the recessed portion to the rest of the deck 10 by a number of torsion arms integral with the recessed portion 10$a$. It is possible to achieve a performance which is equivalent to the use of a rotor of greater moment of inertia by such mounting. The rotor may itself serve other purposes; for example, the rotor can be a gramophone record disc, if the disc is provided with magnetic inserts that can be magnetised appropriately.

Another advantage of the apparatus described resides in the ease with which the desired permanent magnetic pole location can be obtained. The rotor can be formed with the magnetic ring, either integrally as described or by securing the strip of loaded plastic material round the turntable rim. By a simple magnetising jig, consisting of a number of suitably disposed poles, the magnetic member of the rotor can then be magnetised in one operation, with good correlation between the magnetic pole spacing of the stator and rotor.

Also, in the motor described it is inherent in the operation that there will be derived from the position sensor, such as the reed switch, a pulse on the transition of each pole pair past the sensor. The output pulses thus obtained can therefore be used as a continuous measurement of the extent of movement of the rotor with respect to the stator at any time. By applying the pulses thus obtained to a suitable counter, or batch counter, a record can be maintained of the extent of movement of the rotor for, for example, position control of machine tools and other displaceable members, and the motor can be stopped, by means of the batch counter, when a given movement has taken place. The motor described can be made with a rotor of low moment of inertia, enabling the rotor to be moved with greater acceleration for a given energising current.

The type of motor described can also be used for advancing a tape in a tape transport mechanism such as a magnetic recorder or playback machine, and in such a case it is possible to use a correlation technique in order to drive the tape at a desired speed. In this technique, as shown diagrammatically in FIG. 10, two playback heads 50 are used, spaced along the direction of movement of the tape 51, and the output of the two heads are applied through a comparator 52, the output of the second head being passed through a delay device 53, the delay of which corresponds to the desired tape speed, having regard to the distance of separation between the two heads. If then the tape is moving at the correct speed, this condition will be apparent by minimum output of the comparator. The comparator output can then be used to control the speed of the motor 54, using circuit means, such as that previously described. The tape speed can thus be ascertained and controlled without any external or visible position marking of the tape. By these and other ways, the speed of the motor can be made to conform to a programme or pattern of speed changes, as may be desired. It is also possible, within certain limits, by using different peripheral pole extents around the periphery of the motor, to give a cyclically varying rotor speed.

An alternative circuit for controlling the speed of the rotor is shown in FIG. 9. The circuit is similar to the previous control circuit in that a magnetically operated switch responsive to the rotation of the rotor is provided to determine the state of the supply to the stator winding. In the present circuit, the stator winding is either energised in one direction or the energisation is removed with a predetermined frequency.

FIG. 9 shows transistors Tr10 and Tr11 connected to a capacitor C100 and resistor R100 to provide an oscillator, the output of which is fed to a centre tapped winding 100 of a stator. Current flows in only one half of the winding at any one time. The speed of rotation of the rotor is thus a function of the frequency of the oscillator i.e., a function of C100 and R100.

A transistor Tr12, the collector of which is connected to the base of Tr10, can be considered as a gating device controlled by both the output of the multivibrator and the output of an oscillator comprising a transistor Tr13. The oscillator also comprises a suitable reactance L10 for sensing the rotation of the rotor which is connected between the collector of Tr13 and the base of Tr12. Thus the signal at the base of Tr12 depends on whether L10 senses a north or a south pole. In view of the fact that circuit values are indicated, it is not considered necessary to describe the circuit in more detail.

If it is desired to use a reed switch to sense the rotation of the rotor, the oscillator can be dispensed with and the reed switch connected to the transistor Tr12 by inserting it between the collector load resistor and the collector. The filtering capacitor connected to the base of Tr12 is also removed.

Starting of the rotor and ensuring that the rotor rotates in a given direction is similar to that already described and will not be further described.

Mention has been made of the fact that the motor described can be adapted for operation by an alternating current supply, such as a conventional mains supply. In this case, the motor runs as a synchronous motor and the driving pulse generating means can be dispensed with. The stator field can be arranged and energised to produce a rotating field, for example by means of shading rings on appropriate poles of the stator, or by using stator windings with a phasing capacitor.

The rotor can be of the ferrite loaded or sintered ferrite material and to increase the utilisation of the magnetic material used, can have poles on opposite exposed surfaces. The stator can have pole faces as shown in FIG. 8. In FIG. 8a, the poles 50 and 51 are shown as being interdigitated; in FIG. 8b as displaced vertically and in FIG. 8c as displaced horizontally. In FIG. 8 the current is indicated by arrow C, and the flux by arrow B. The rotor ferrite width in relation to the stator poles, is also shown.

We claim:
1. An electric motor comprising a rotor mounted for rotation about an axis and including a ring of material containing permanent magnetic material bonded by a plastics material to provide a number of magnetic poles of alternately opposite polarity disposed annularly about the axis of rotation of the rotor;

a stator assembly comprising a coil and two plates of magnetic material containing therebetween said coil, each plate having one edge provided with fingers forming stator pole faces, and the fingers of the plate being interdigitated whereby, when the coil is energised, stator poles of alternately opposite polarity are produced which co-operate with the magnetic poles of the rotor to drive the motor, said edge being situated opposite a portion only of the circumference of the ring of permanent magnetic material;

rotor position sensor means disposed adjacent the ring of permanent magnetic material in a position displaced from the stator assembly in a direction peripheral of said rotor and arranged to respond to the poles of the rotor during rotation to derive an electrical signal in accordance with the rotation of the rotor; and control means responsive to said signal for controlling energisation of said coil and the rotation of the rotor.

2. An electric motor according to claim 1, wherein the rotor is moulded from plastics material, the ring of permanent magnetic material being moulded in or integral with the rotor.

3. An electric motor according to claim 1, wherein the rotor position sensor means is a reed switch.

4. An electric motor according to claim 3, and comprising magnetic biasing means for said reed switch.

5. An electric motor according to claim 1 wherein said control means comprises a comparator to which said electrical signal is applied, reference signal source means for applying said reference signal to said comparator, said comparator being arranged to produce a difference signal, corresponding to the difference between the said signals applied thereto, and means for controlling the energisation of said winding in accordance with said difference signal.

6. An electric motor according to claim 5, wherein said reference signal source is an oscillator circuit.

7. An electric motor according to claim 6, wherein said winding has two sections, said motor including a d.c. supply two semiconductor switch means arranged to connect said winding sections alternately across said supply, and means controlled by said oscillator for controlling said switches alternately.

8. An electric motor according to claim 1 and comprising a plurality of stator sections, said stators being displaced in a direction peripheral of said rotor.

* * * * *